(12) United States Patent
Chen

(10) Patent No.: US 6,398,414 B1
(45) Date of Patent: Jun. 4, 2002

(54) STRUCTURE OF A BEARING

(75) Inventor: Chien-Jung Chen, Kaohsiung (TW)

(73) Assignee: Yen Sun Technology Corp. (TW)

( * ) Notice: Subject to any disclaimer, the term of this patent is extended or adjusted under 35 U.S.C. 154(b) by 0 days.

(21) Appl. No.: 09/642,943

(22) Filed: Aug. 22, 2000

(51) Int. Cl.[7] .............................................. F16C 32/06
(52) U.S. Cl. ........................ 384/120; 384/111; 384/291
(58) Field of Search ............................. 384/120, 111, 384/118, 114, 291, 292

(56) References Cited

U.S. PATENT DOCUMENTS 4,366,993 A * 1/1983 Ono et al.

* cited by examiner

Primary Examiner—Lenard A. Footland
(74) Attorney, Agent, or Firm—Larson & Taylor, PLC

(57) ABSTRACT

The bearing mainly includes an inner groove and at least a passage. The groove is arranged on an inner surface of the bearing and connected with a reservoir on one end of the bearing by the passage to induce the outflow lubricant backflow to the groove.

7 Claims, 9 Drawing Sheets

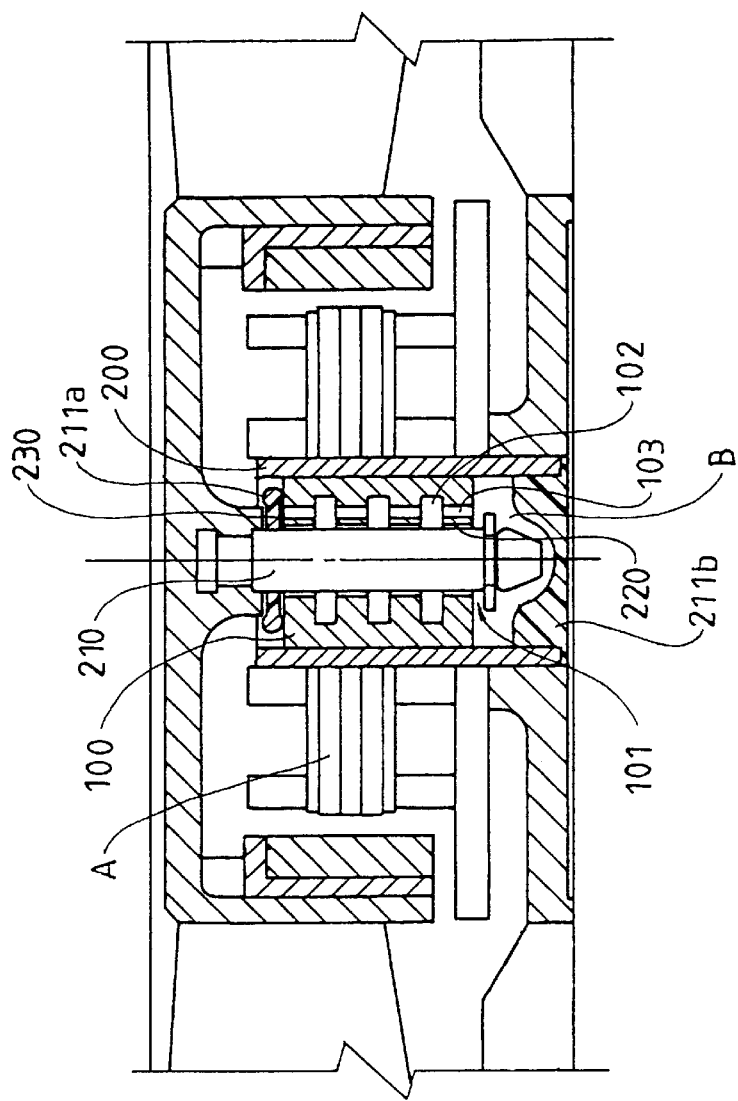
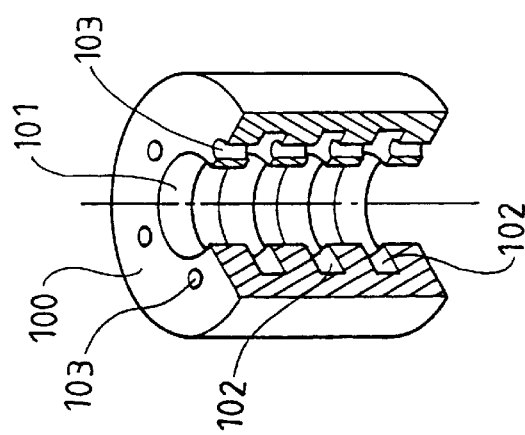
FIG. 6
FIG. 5

STRUCTURE OF A BEARING

BACKGROUND OF THE INVENTION

1. Field of the Invention

The present invention is related to the structure of a bearing and more particularly to the groove of the oil-pregnant bearing for circling oil to lubricate the surface of its inner diameter.

2. Description of the Related Art

R.O.C. Pat. Publication No. 390,549 published on May 11, 2000 discloses "An improved structure of an oil-pregnant bearing for mini motor". FIG. 1 illustrates a perspective view of the oil-pregnant bearing in accordance with No. 390,549.

Referring to FIG. 1, No. 390,549 discloses a bearing 1 including an axial hole 2 and a plurality of grooves 3 which are arranged in parallel each other and extended on the surface of the axial hole 2 along the axial direction. FIG. 2 illustrates an axial sectional view of the oil-pregnant bearing assembled in a fan in accordance with No. 5390,549. Referring to FIG. 2, the bearing 1 is held in the tube of the stator A and a shaft 4 penetrated the axial hole 2 of the bearing 1. When the shaft 4 is rotated, the lubricant between the bearing 2 and the shaft 4 is driven to spin and move along the grooves 3. Thus the lubricant outflow is occurred at the gap on the end of the bearing 1 and the stator A is polluted. However, the defect of No. 390,549 is failure to storage the lubricant and the pollution of the lubricant outflow.

R.O.C. Pat. Publication No. 390,548 published on May 11, 2000 discloses "A structure of an oil-pregnant bearing of mini motor for lubricant recycling". FIG. 3 illustrates an axial sectional view of the oil-pregnant bearing assembled in a fan in accordance with No. 390,548. Referring to FIG. 3, No. 390,548 discloses a bearing 1 with an outer surface providing a plurality of grooves 3a which are extended to either end or the opposite ends of the bearing 1. Accordingly, the grooves 3a are connected to the axial hole 2. Although the grooves 3a cycle automatically to induce the recycling lubricant, the grooves 3a necessitate to detour the outer surface of the bearing 1 thereby having increased loop for cycling the lubricant. Therefore, it reduces the efficiency of lubricant cycling which still cannot solve the pollution problem of the lubricant outflow.

R.O.C. Pat. Publication No. 376,959 published on Dec. 2, 1999 discloses "A structure of a shaft for heat dissipater". FIG. 4 illustrates a partial sectional view of the heat dissipater in accordance with No. 376,959. Referring to FIG. 4, No. 376,959 discloses a shaft 10 on which surface provides a spiral groove 12 and a reservoir 13 connecting with a corresponding induced groove 22 of a bearing 20 provided on the outer surface 21 of a bearing 20 to form a lubricant cycling path. Because of the rotation of the shaft 10 and the capillarity of the gap between the shaft 10 and the bearing 20, the lubricant is driven in the gap from one end of the bearing 20 to another. And then, the outflow of the lubricant is induced the backflow along the groove 22 from one end of the bearing 20 to another to lubricate the gap. In order to prevent the lubricant flow away, two seals 23 seal the two ends of the bearing 20. Even if No. 376,959 can avoid the pollution of the lubricant outflow, the spiral groove 12 and the reservoir 13 provided on the thinner diameter of the shaft 10 merely store inadequate lubricant. Therefore, the above defect reduces the useful life of the bearing 20.

The present invention intends to provide the structure of a bearing which is provided increased diameter of an inner groove and an inner reservoir connected with a plurality of passages to directly induce the outflow of the lubricant in such a way to mitigate and overcome the above problem. The passages of the bearing are penetrated on the periphery of the hole and extended along the longitudinal direction to reduce recycle loop thereby increasing the efficiency of lubricant recycling.

SUMMARY OF THE INVENTION

The primary objective of this invention is to provide the structure of a bearing including an inner groove and a plurality of passages directly induces the outflow of the lubricant to form the recycle loop. Thus the passages of the bearing increase the efficiency of lubricant recycling.

The secondary objective of this invention is to provide the structure of a bearing including a inner groove connected with ends of the bearing by a plurality of passages to form the recycle loop. Thus the groove connected with the passages simplifies the structure of the bearing.

The present invention is the structure of a bearing for recycling lubricant. The bearing mainly includes an inner groove and at least a passage. The groove is arranged on an inner surface of the bearing and connected with a reservoir on one end of the bearing by the passage to induce the outflow lubricant backflow to the groove.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein:

FIG. 5 is a partial sectional view of the structure of a bearing in accordance with a first embodiment of the present invention;

FIG. 6 is an axial view of the bearing assembled in a fan in accordance with the first embodiment of the present invention;

DETAILED DESCRIPTION OF THE INVENTION

Figure 1:
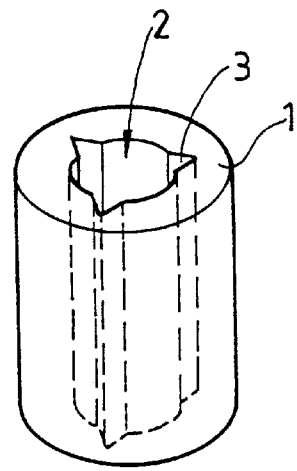
FIG. 1 is a perspective view of the oil-pregnant bearing in accordance with R.O.C. Pat. Publication No. 390,549.
Figure 2:
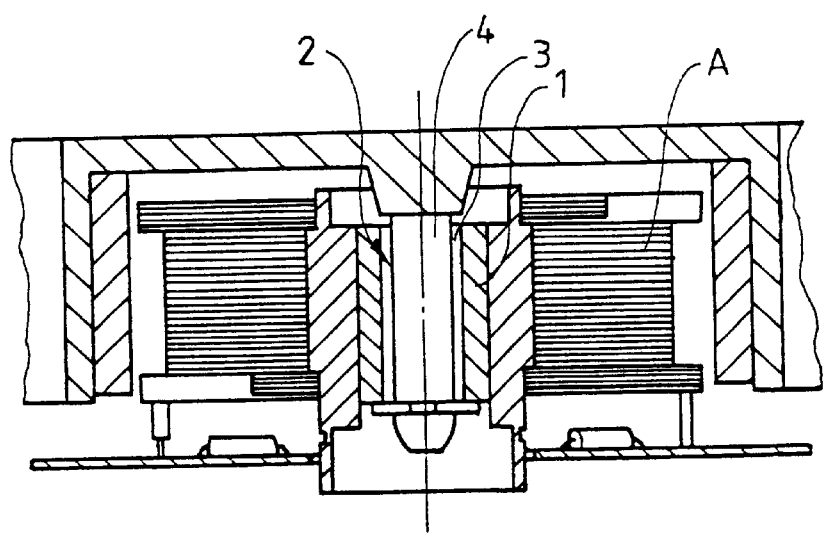
FIG. 2 is an axial sectional view of the oil-pregnant bearing assembled in a fan in accordance with R.O.C. Pat. Publication No. 390,549.

The structure of a bearing in accordance with the present invention mainly includes an inner groove for storing lubricant and a plurality of passages connected the groove and ends of the bearing as well as a reservoir to form a recycling lubricant loop. The connection the passage with the groove simplifies the structure of the recycling lubricant loop.

The groove is arranged on an inner surface of the bearing and connected with a reservoir on one end of the bearing by the passage in accordance with the present invention to directly induce the outflow lubricant backflow to the groove thereby increasing the efficiency of lubricant recycling.

FIG. 5 illustrates a partial sectional view of the structure of a bearing in accordance with a first embodiment of the present invention; FIG. 6 illustrates an axial view of the bearing assembled in a fan in accordance with the first embodiment of the present invention; and FIG. 7 illustrates an enlarged view of the bearing in accordance with the first embodiment of the present invention.

Referring to FIG. 5, a bearing 100 mainly includes a hole 101, a plurality of inner grooves 102 and a plurality of passages 103. The hole 101 connected one end of the bearing 100 to another for receiving a shaft (not labeled). The grooves 102, which define parts of the surface of the hole 101, are annular grooves. arranged parallel one another and perpendicular to the longitudinal direction of the hole 101. The passages 103 are provided on the periphery of the hole 101 and extended along the longitudinal direction from one end of the bearing 100 to another. The passages 103 further connect the ends of the bearing 100 to the grooves 102. Accordingly, a reservoir arranged at the end of the bearing 100 can be connected with the grooves 102 by the passages 103 thereby recycling the outflow lubricant from the end of the bearing 100 to the groove 102.

Referring to FIG. 6, the bearing 100 is assembled in a stator A of a fan and received in a tube 200 for supporting a shaft 210 of a fan blade (not labeled) by penetrated means. At the two ends of the bearing 100 provide two seals 211a and 211b. The seal 211a seals the end of the shaft 210 to form an isolation area 230 to prevent the lubricant outflow running off, and the seal 211b seals the end of the tube 200 to form a reservoir B among the bearing 100, the tube 200 and the seal 211b that the reservoir B can store the lubricant outflow.

Figure 7:
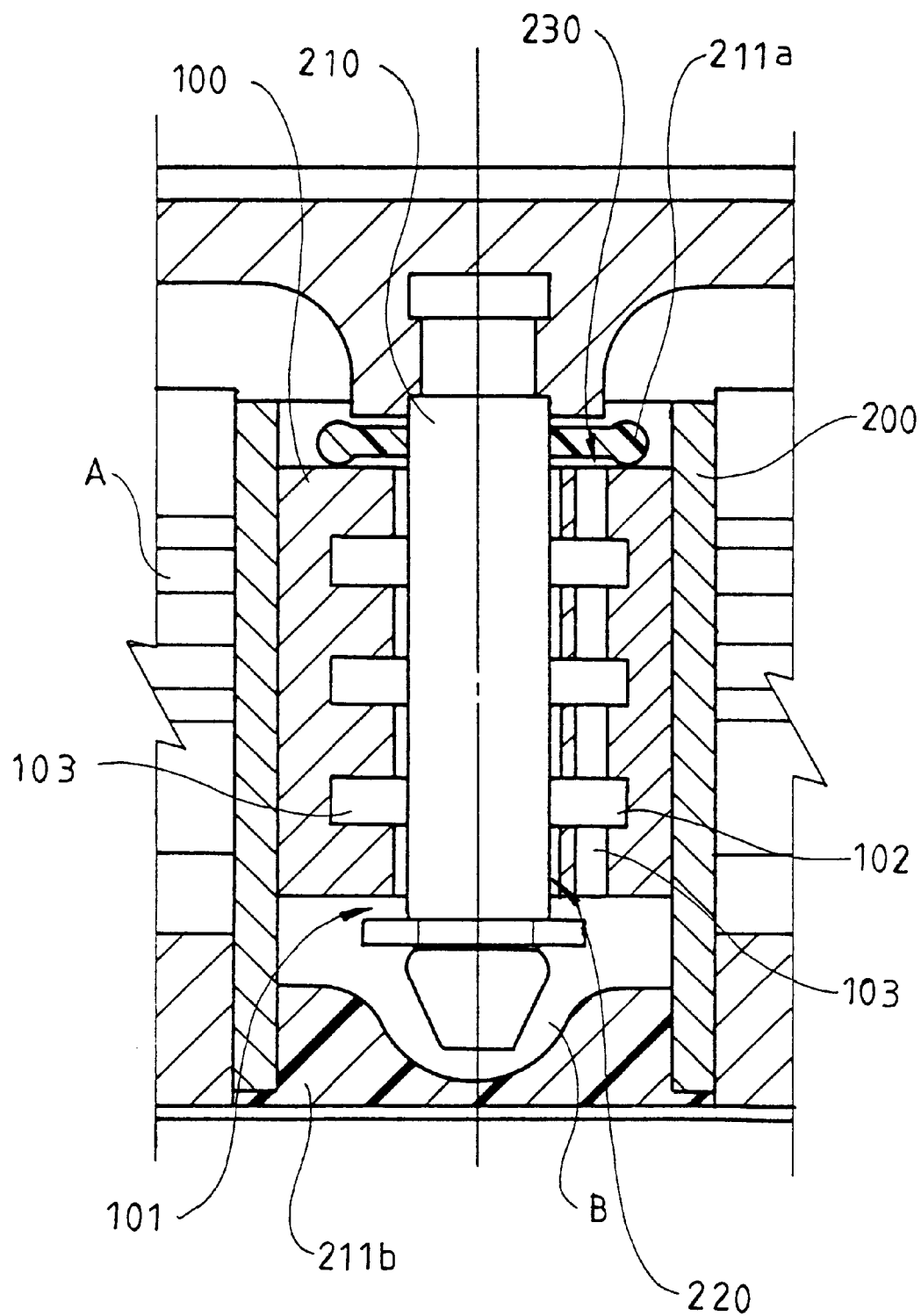
FIG. 7 is an enlarged view of the bearing in accordance with the first embodiment of the present invention.

Referring to FIG. 7, when the shaft 210 rotates, the lubricant located in the grooves 102 and reservoir B is driven to rotate. Accordingly, the driven lubricant outflows along the gap between bearing 100 and the shaft 210 to the end. At first the lubricant outflow is temporarily stored in the isolation area 230. Meanwhile, a backflow lubricant is induced by the passages 103 flowing to the grooves 102 and the reservoir B. The lubricant enters and lubricates the gap by means of the capillary attraction of itself. Therefore, the passages 103 directly induce the outflow lubricant thereby increasing the efficiency of recycling.

Comparing FIG. 1 with FIG. 6, the bearing 1 in accordance with No. 390,549 extends in longitudinal direction and fails to induce a backflow for recycling the lubricant outflow. However, the passages 103 of the bearing 100 in accordance with the first embodiment of the present invention directly induce a backflow to the grooves 102 and the reservoir B. In addition, the passages 103 connect the grooves 102 one another to uniform the lubricant distribution.

Figure 3:
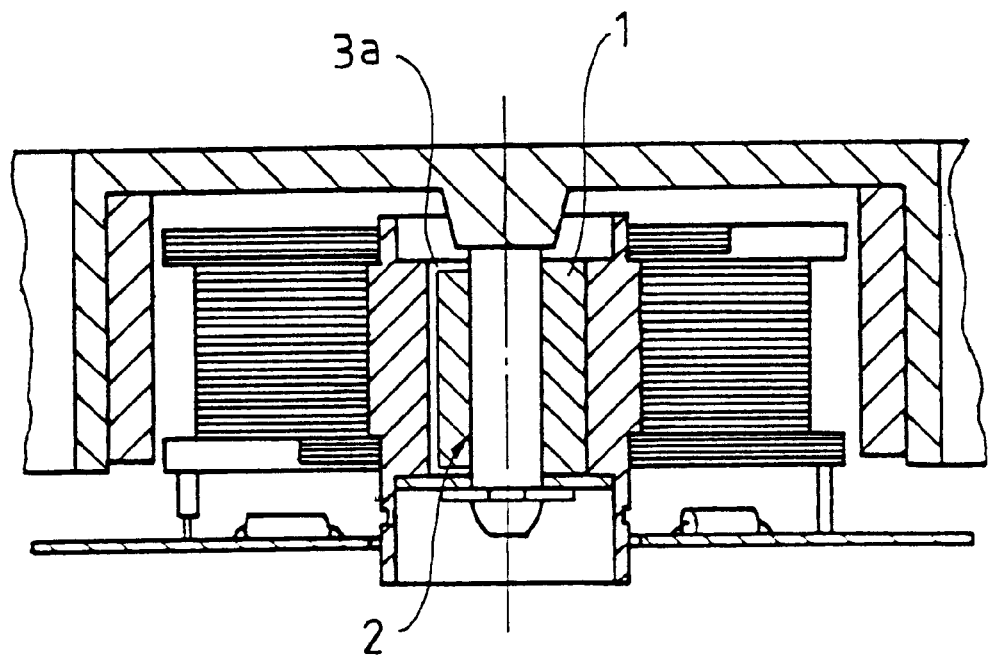
FIG. 3 is an axial sectional view of the oil-pregnant bearing assembled in a fan in accordance with R.O.C. Pat. Publication No. 390,548.

Comparing FIG. 3 with FIG. 6, even though the outflow lubricant can be induced by the grooves 3a arranged on the outer surface of the bearing 1 in accordance with No. 390,548, the lubricant cycling necessitates to detour the outer surface of the bearing 1 that the efficiency of recycling is reduced. Moreover, No. 390,548 cannot avoid the pollution of the lubricant outflow and running off the lubricant. However, the passages 103 of the bearing 100 in accordance with the first embodiment of the present invention directly induce a backflow to the grooves 102 and the reservoir B. In addition, the passages 103 connect the grooves 102 one another to uniform the lubricant distribution.

Figure 4:
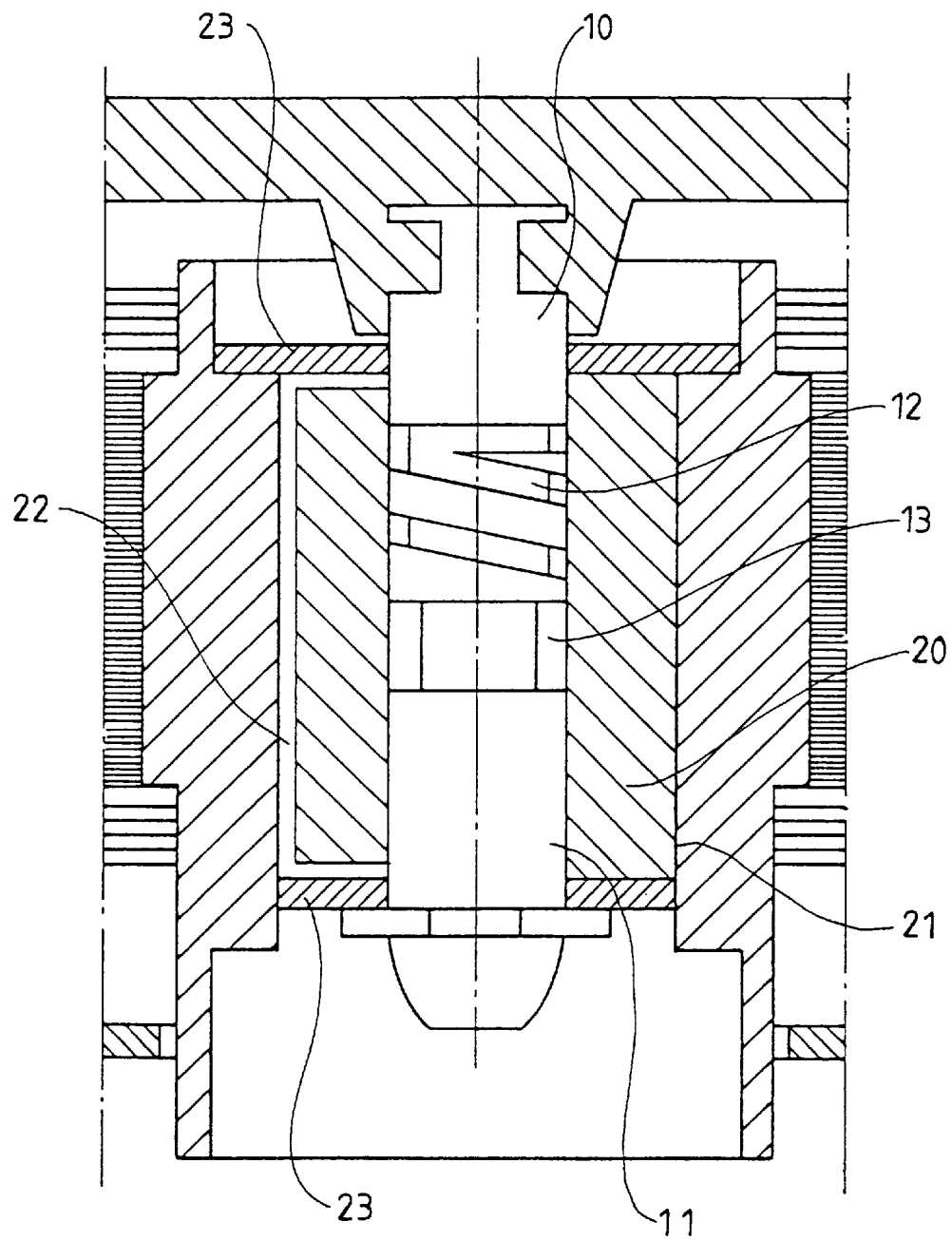
FIG. 4 is a partial sectional view of the heat dissipater in accordance with R.O.C. Pat. Publication No. 376,959.

Comparing FIG. 4 with FIG. 6, the outflow lubricant can be induced by the grooves 22 arranged on the outer surface 21 of the bearing 20 in accordance with No. 376,959, the lubricant cycling necessitates to detour the outer surface 21 of the bearing 20 that the efficiency of recycling is reduced. The grooves 22 do not induce the outflow lubricant into the bearing 20, but to the ends of the bearing 20. The spiral groove 12 and the reservoir 13 provided on the thinner diameter of the shaft 10 merely store inadequate lubricant thereby reducing the useful life of the bearing 20. However, the passages 103 of the bearing 100 not only reduce the recycling loop but also directly induce the lubricant into the bearing 100 to increase the efficiency of recycling the lubricant. Moreover, the present invention utilizes the seal attached to the end of the bearing 100 to form the reservoir B so as to increase the storage of the lubricant.

FIGS. 8–11 illustrate the axial view of the bearing assembled in a fan in accordance with a second through fifth embodiment of the present invention.

Figure 8:
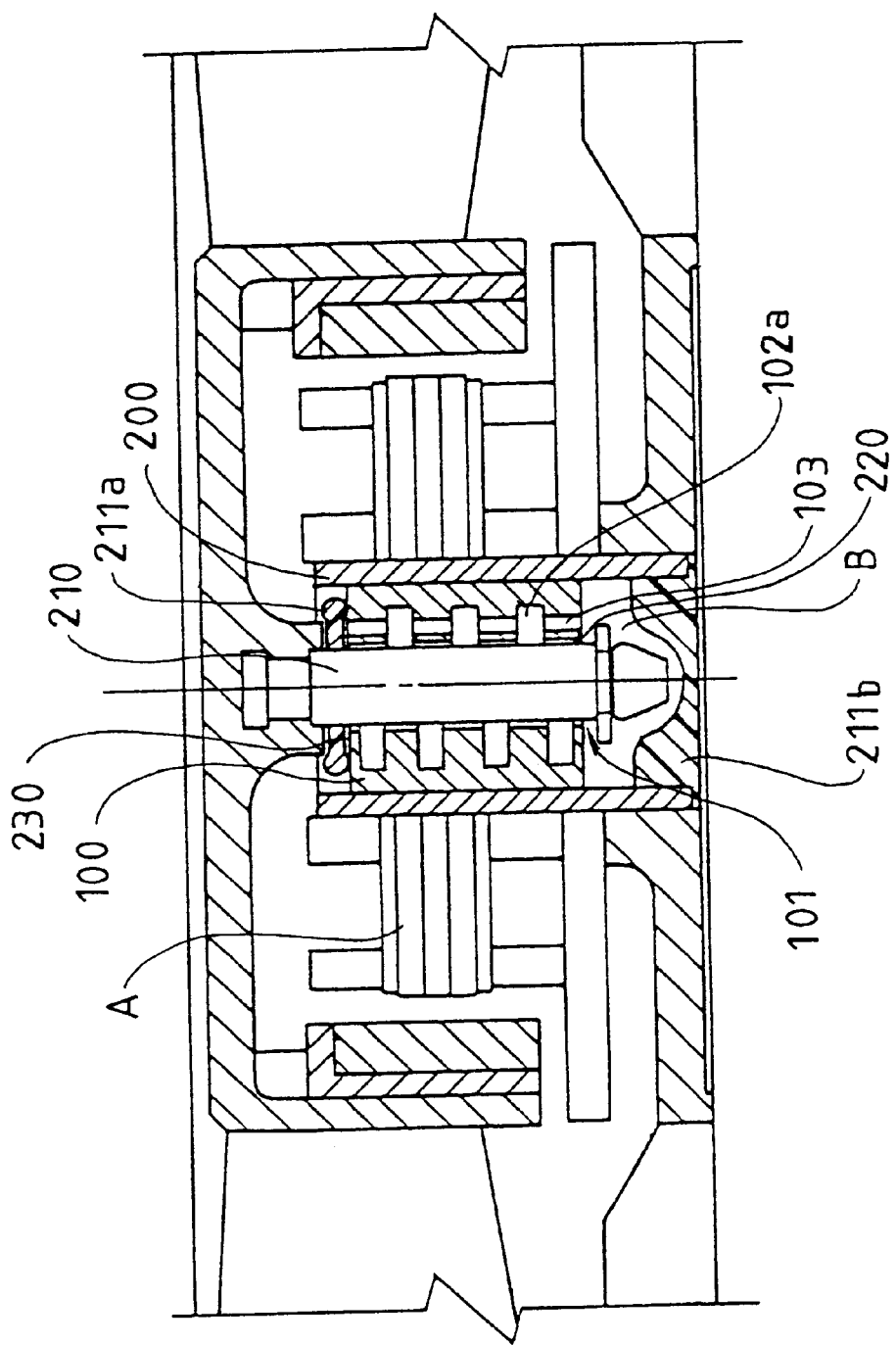
FIG. 8 is an axial view of the bearing assembled in a fan in accordance with a second embodiment of the present invention.

Referring to FIG. 8, a bearing 100 in accordance with the second embodiment mainly includes a hole 101, a groove 102a and a plurality of passages 103. The groove 102a is a spiral groove arranged helix along the longitudinal direction of the hole 101. The passages 103 are extended along the longitudinal direction from one end of the bearing 100 to another. The passages 103 further connect the ends of the bearing 100 to the grooves 102a. Accordingly, a backflow of the outflow lubricant flows to the groove 102a and enters the gap between the bearing 100 and a shaft 210 by means of the capillary attraction of the lubricant. The bearing 100 is assembled in a stator A of a fan and received in a tube 200 for supporting a shaft 210 of a fan blade (not labeled) by penetrated means. At the two ends of the bearing 100 provide two seals 211a and 211b. The seal 211a seals the end of the shaft 210 to form an isolation area 230 to prevent the lubricant outflow running off, and the seal 211b seals the end of the tube 200 to form a reservoir B among the bearing 100, the tube 200 and the seal 211b that the reservoir B can store the lubricant outflow. At first the lubricant outflow is temporarily stored in the isolation area 230. Meanwhile, a backflow lubricant is induced by the passages 103 flowing to the grooves 102a and the reservoir B. The lubricant enters and lubricates the gap by means of the capillary attraction of itself. Comparing the second embodiment to the first embodiment, the groove 102a of the second embodiment is a spiral groove in the contrast of the groove 102 of the first embodiment, as shown in FIGS. 6 and 8.

Figure 9:
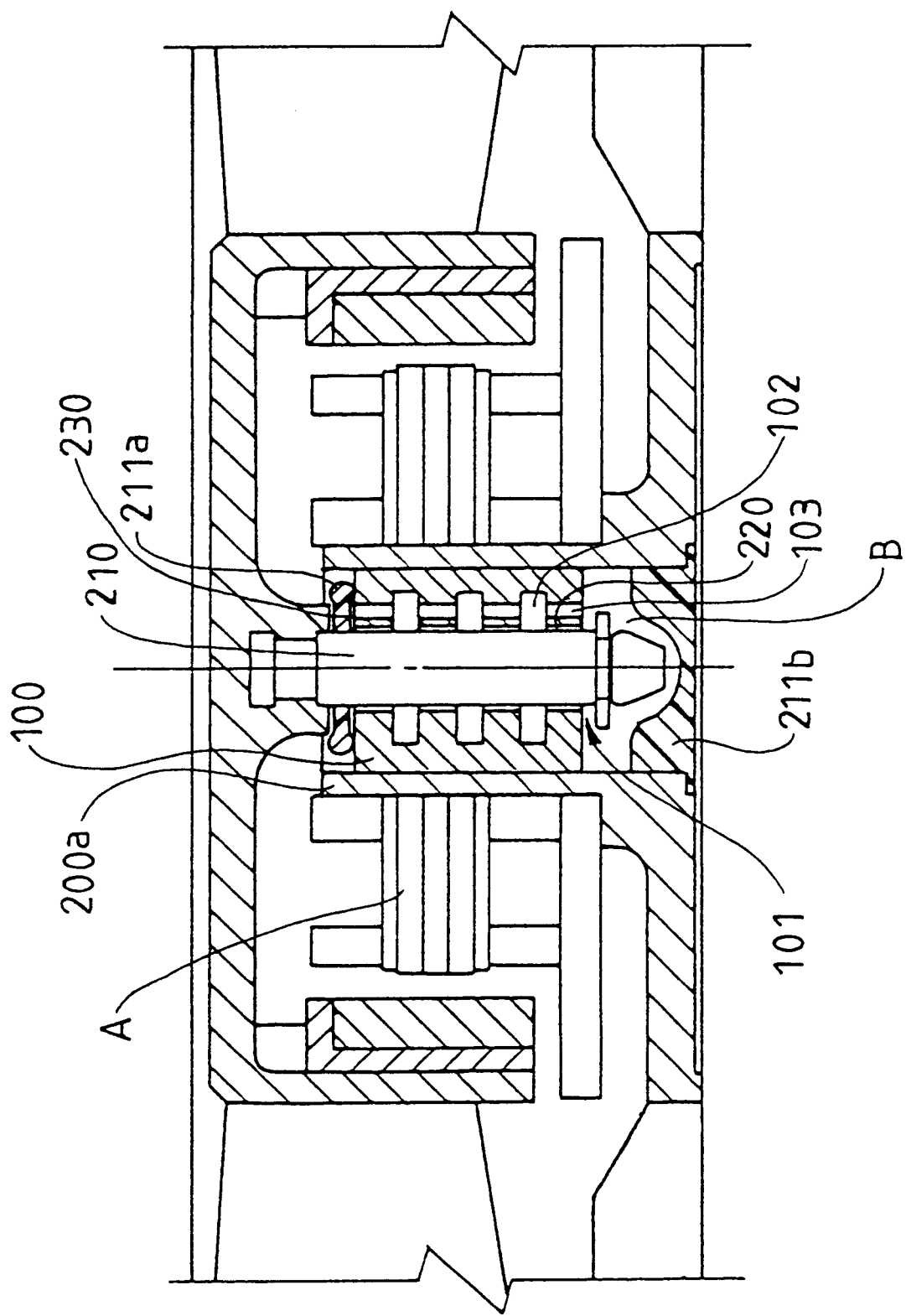
FIG. 9 is an axial view of the bearing assembled in a fan in accordance with a third embodiment of the present invention.

Referring to FIG. 9, a bearing 100 in accordance with the third embodiment mainly includes a hole 101, a plurality of grooves 102 and a plurality of passages 103. The passages 103 are extended along the longitudinal direction from one end of the bearing 100 to another. The passages 103 further connect the ends of the bearing 100 to the grooves 102a. Accordingly, a backflow of the outflow lubricant flows to the groove 102 and enters the gap between the bearing 100 and a shaft 210 by means of the capillary attraction of the lubricant. The bearing 100 is assembled in a stator A of a fan and received in a tube 200a projected from a case (not labeled) for supporting a shaft 210 of a fan blade (not labeled) by penetrated means. At the two ends of the bearing 100 provide two seals 211a and 211b. The seal 211a seals the end of the shaft 210 to form an isolation area 230 to prevent the lubricant outflow running off, and the seal 211b seals the end of the tube 200a to form a reservoir B among the bearing 100, the tube 200a and the seal 211b that the reservoir B can store the lubricant outflow. At first the lubricant outflow is temporarily stored in the isolation area 230. Meanwhile, a backflow lubricant is induced by the passages 103 flowing to the grooves 102 and the reservoir B. The lubricant enters and lubricates the gap by means of the capillary attraction of itself. Comparing the third embodiment to the other embodiment, the bearing 100 of the third embodiment is simply received in the tube 200a extended from the bearing 100 in the contrast of the tube 200 of the other embodiment, as shown in FIGS. 6, 8 and 9.

Figure 10:
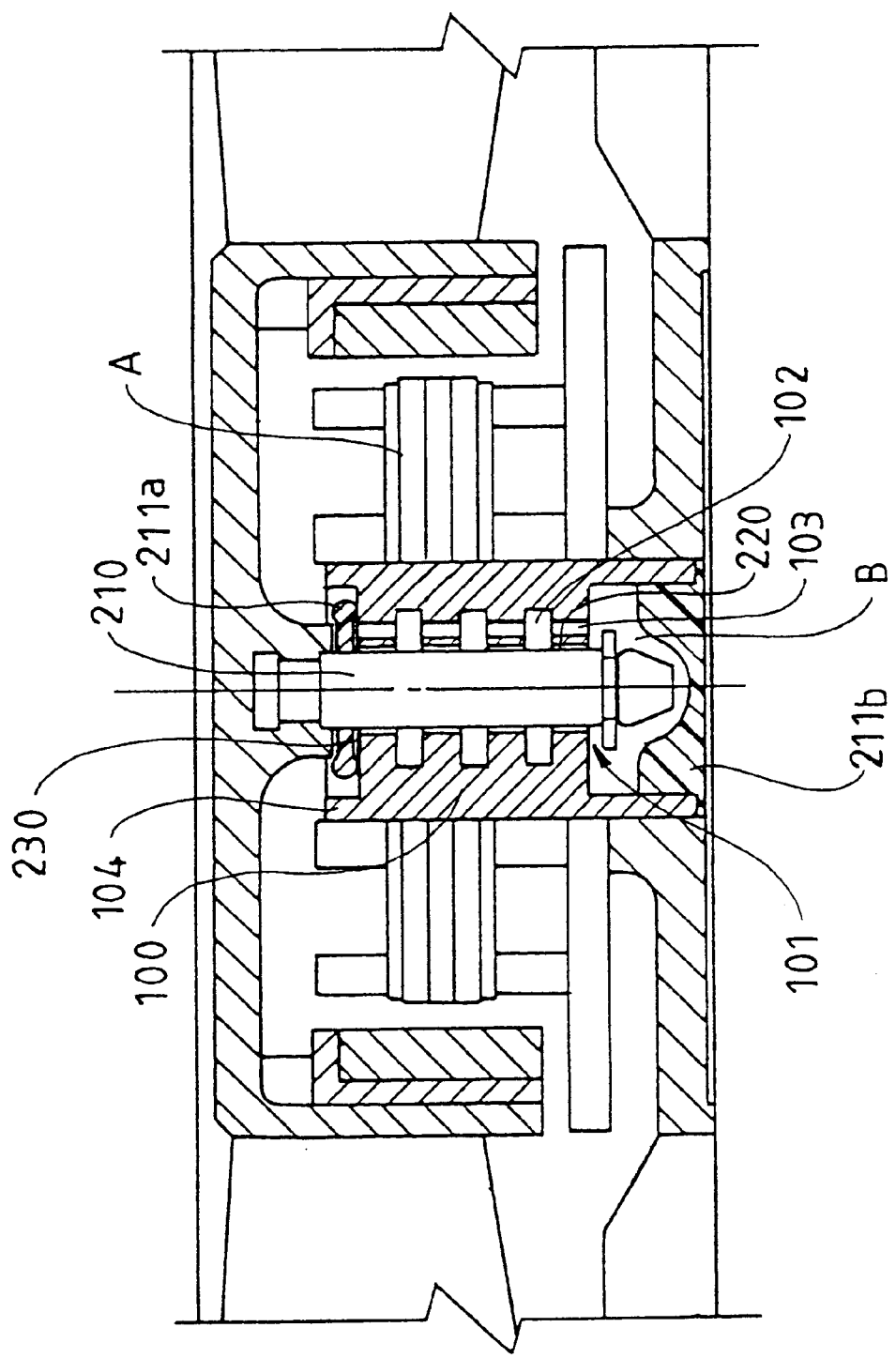
FIG. 10 is an axial view of the bearing assembled in a fan in accordance with a fourth embodiment of the present invention.

Referring to FIG. 10, a bearing 100 in accordance with the fourth embodiment mainly includes a hole 101, a plurality of grooves 102, a plurality of passages 103 and two annular flanges 104. The passages 103 are extended along the longitudinal direction from one end of the bearing 100 to another. The passages 103 further connect the ends of the bearing 100 to the grooves 102a. Accordingly, a backflow of the outflow lubricant flows to the groove 102 and enters the gap between the bearing 100 and a shaft 210 by means of the capillary attraction of the lubricant. The annular flanges 104 are projected from the two ends of the bearing 100 and restrict the lubricant outflow in itself. The bearing 100 is assembled in a stator A of a fan for supporting a shaft 210 of a fan blade (not labeled) by penetrated means. At the two ends of the bearing 100 provide two seals 211a and 211b. The seal 211a seals the annular flange 104 to form an isolation area 230 to prevent the lubricant outflow running off, and the seal 211b seals the annular flange 104 to form a reservoir B which can store the lubricant outflow. At first the lubricant outflow is temporarily stored in the isolation area 230. Meanwhile, a backflow lubricant is induced by the passages 103 flowing to the grooves 102 and the reservoir B. The lubricant enters and lubricates the gap by means of the capillary attraction of itself. Comparing the fourth embodiment to the other embodiment, the bearing 100 of the fourth embodiment projecting two annular flanges is simply received in the stator A in the contrast of the bearing 100 received in the tube 200 of the other embodiment, as shown in FIGS. 6, 8, 9 and 10.

Figure 11:
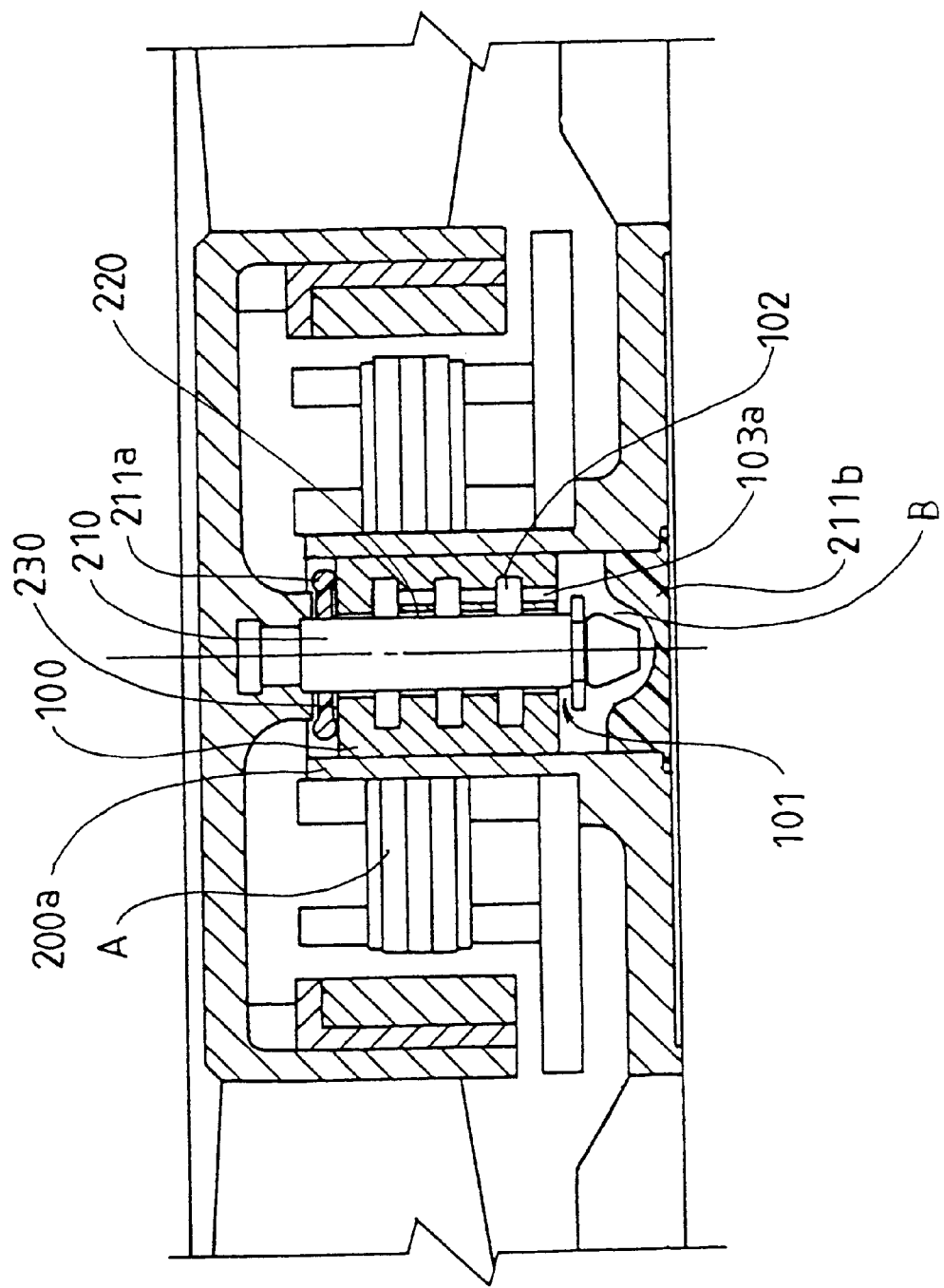
FIG. 11 is an axial view of the bearing assembled in a fan in accordance with a fifth embodiment of the present invention.

Referring to FIG. 11, a bearing 100 in accordance with the fifth embodiment mainly includes a hole 101, a plurality of grooves 102 and a plurality of passages 103a. The passages 103a are extended along the longitudinal direction from one end of the bearing 100 to connect the grooves 102. Accordingly, a backflow of the outflow lubricant flows to the grooves 102 and enters the gap between the bearing 100 and a shaft 210 by means of the capillary attraction of the lubricant. The bearing 100 is assembled in a stator A of a fan and received in a tube 200a projected from a case (not labeled) for supporting a shaft 210 of a fan blade (not labeled) by penetrated means. At the two ends of the bearing 100 provide two seals 211a and 211b. The seal 211a seals the end of the shaft 210 to form an isolation area 230 to prevent the lubricant outflow running off, and the seal 211b seals the end of the tube 200 to form a reservoir B among the bearing 100, the tube 200a and the seal 211b that the reservoir B can store the lubricant outflow. At first the lubricant outflow is temporarily stored in the isolation area 230. Meanwhile, the passages 103a flowing to the reservoir B and the grooves 102 induce a backflow lubricant. The lubricant enters and lubricates the gap by means of the capillary attraction of itself. Comparing the fifth embodiment to the fifth embodiment, the passages 103a of the fifth embodiment connect grooves 102 with one end of the bearing 100 in the contrast of the passages 103 of the other embodiment, as shown in FIGS. 6, 8, 9, 10 and 11.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A structure of a bearing comprising:
   a hole connecting two ends of the bearing for receiving a shaft;
   at least one groove defining part of a surface of the hole; and
   a plurality of passages connecting the end of the bearing to the groove;
   wherein the outflow lubricant is induced by the passages from the end of the bearing to the groove, and wherein a plurality of the grooves are annular grooves arranged parallel one another and perpendicular to the longitudinal direction of the hole.

2. The structure of a bearing as defined in claim 1, wherein the bearing is received in a stator to reduce the elements of a fan.

3. The structure of a bearing as defined in claim 2, wherein the bearing projects two annular flangs at its two ends to from a reservoir.

4. The structure of a bearing as defined in claim 1, wherein the passages further connect the one end of the bearing to another end thereof, thereby recycling the outflow lubricant from the two ends of the bearing to the groove.

5. The structure of a bearing as defined in claim 1, wherein when the bearing is assembled in a stator and received in a tube for supporting a shaft, a seal seals the end of the tube to form a reservoir among the bearing, the tube and the seal.

6. The structure of a bearing as defined in claim 5, wherein when the bearing is assembled in a stator and received in a tube for supporting a shaft, a seal seals the end of the bearing to form an isolation area. projects two annular flanges at its two ends to form a reservoir.

7. The structure of a bearing as defined in claim 1, further comprising an axial tube extended from a fan casing to reduce elements of a fan.

* * * * *